US008621005B2

(12) United States Patent
Boyd et al.

(10) Patent No.: US 8,621,005 B2
(45) Date of Patent: Dec. 31, 2013

(54) COMPUTER-BASED METHODS AND SYSTEMS FOR ARRANGING MEETINGS BETWEEN USERS AND METHODS AND SYSTEMS FOR VERIFYING BACKGROUND INFORMATION OF USERS

(75) Inventors: John Boyd, Ridgefield, CT (US); Arif Ayub, Karachi (PK)

(73) Assignee: TTB Technologies, LLC, Old Greenwich, CT (US)

( * ) Notice: Subject to any disclaimer, the term of this patent is extended or adjusted under 35 U.S.C. 154(b) by 81 days.

(21) Appl. No.: 13/096,544

(22) Filed: Apr. 28, 2011

(65) Prior Publication Data

US 2011/0270926 A1    Nov. 3, 2011

Related U.S. Application Data

(60) Provisional application No. 61/328,813, filed on Apr. 28, 2010.

(51) Int. Cl.
G06F 15/16    (2006.01)

(52) U.S. Cl.
USPC ............... 709/204; 709/202; 709/206; 726/4; 726/6

(58) Field of Classification Search
USPC .......................... 709/204–206, 202; 726/4, 6
See application file for complete search history.

(56) References Cited

U.S. PATENT DOCUMENTS

| 7,072,944 | B2 * | 7/2006 | Lalonde et al. | 709/206 |
|---|---|---|---|---|
| 7,155,739 | B2 | 12/2006 | Bari et al. | 726/6 |
| 7,249,175 | B1 | 7/2007 | Donaldson | 709/206 |
| 7,437,558 | B2 * | 10/2008 | Fenton et al. | 713/170 |
| 7,529,937 | B2 | 5/2009 | Tribble et al. | 713/168 |
| 7,571,319 | B2 | 8/2009 | Gillum et al. | 713/155 |
| 7,603,556 | B2 | 10/2009 | Brown et al. | 713/169 |
| 7,673,047 | B2 | 3/2010 | Delaney et al. | 709/225 |
| 8,171,085 | B1 * | 5/2012 | Tevanian, Jr. | 709/206 |
| 8,495,151 | B2 * | 7/2013 | Bodapati et al. | 709/206 |
| 2003/0097342 | A1 | 5/2003 | Whittingtom | 705/75 |
| 2003/0212790 | A1 * | 11/2003 | Thambidurai et al. | 709/225 |
| 2006/0031315 | A1 * | 2/2006 | Fenton et al. | 709/206 |
| 2006/0150242 | A1 | 7/2006 | Doyle | 726/5 |
| 2006/0200582 | A1 * | 9/2006 | Phipps | 709/245 |
| 2007/0005702 | A1 | 1/2007 | Tokuda et al. | 709/206 |
| 2007/0218900 | A1 * | 9/2007 | Abhyanker | 455/435.1 |
| 2008/0120166 | A1 | 5/2008 | Fernandez et al. | 705/10 |
| 2008/0126344 | A1 | 5/2008 | Hoffman et al. | 707/999.005 |
| 2008/0307500 | A1 | 12/2008 | Garnier DeFalletans | 726/3 |
| 2008/0320591 | A1 | 12/2008 | Fenton et al. | 726/22 |
| 2009/0055915 | A1 | 2/2009 | Piliouras | 726/8 |
| 2009/0100529 | A1 * | 4/2009 | Livnat et al. | 726/28 |
| 2009/0106846 | A1 | 4/2009 | Dupray | 726/26 |
| 2009/0132813 | A1 | 5/2009 | Schibuk | 713/158 |
| 2009/0138711 | A1 * | 5/2009 | Heimbigner | 713/170 |
| 2009/0138953 | A1 | 5/2009 | Lyon | 726/9 |
| 2009/0172783 | A1 | 7/2009 | Eberstadt | 726/4 |
| 2009/0177744 | A1 * | 7/2009 | Marlow et al. | 709/204 |
| 2009/0178125 | A1 * | 7/2009 | Barber et al. | 726/6 |

(Continued)

*Primary Examiner* — Wing F Chan
*Assistant Examiner* — Razu Miah

(57) ABSTRACT

Methods and systems for verifying, authenticating, and/or rating the identity or profile characteristics of users of online social networks and other websites and applications. And improved systems and methods that allow one or more individuals to meet or otherwise network or connect or transact or exchange information, tangibles or intangibles with other individuals and methods and systems for verifying and/or rating the identity or profiles of users of online social networks and other websites or applications.

11 Claims, 9 Drawing Sheets

(56) References Cited

U.S. PATENT DOCUMENTS

| | | | |
|---|---|---|---|
| 2009/0187435 A1 | 7/2009 | Carr et al. | 705/5 |
| 2009/0222519 A1 | 9/2009 | Boyd | 709/204 |
| 2009/0228294 A1 | 9/2009 | Choi et al. | 705/1.1 |
| 2009/0265639 A1* | 10/2009 | Shuster | 715/747 |
| 2009/0276233 A1 | 11/2009 | Brimhall et al. | 705/1 |
| 2009/0320101 A1* | 12/2009 | Doyle et al. | 726/4 |
| 2009/0327054 A1 | 12/2009 | Yao et al. | 705/12 |
| 2009/0328173 A1 | 12/2009 | Jakobson et al. | 726/7 |
| 2010/0017431 A1 | 1/2010 | Schmidt et al. | 707/102 |
| 2010/0020952 A1 | 1/2010 | Leung et al. | 379/142.02 |
| 2010/0042680 A1 | 2/2010 | Czyzewicz et al. | 709/203 |

* cited by examiner

COMPUTER-BASED METHODS AND SYSTEMS FOR ARRANGING MEETINGS BETWEEN USERS AND METHODS AND SYSTEMS FOR VERIFYING BACKGROUND INFORMATION OF USERS

RELATED APPLICATION DATA

This application claims priority to U.S. Provisional Patent Application Ser. No. 61/328,813, entitled "Computer-based Methods and Systems for Arranging Meetings Between Users and Methods and Systems for Verifying the Background Information of Users" filed Apr. 28, 2010, hereby incorporated by reference.

TECHNICAL FIELD

The present invention relates to online or mobile computing. More particularly, the present invention relates to improved systems and methods that allow one or more individuals to meet or otherwise network or connect or transact or exchange information, tangibles or intangibles with other individuals and methods and systems for verifying and/or rating the identity or profiles of users of online social networks and other websites or applications.

BACKGROUND

Several publications are referenced in this application. The cited references describe the state of the art to which this invention pertains and are hereby incorporated by reference.

There are a variety of on-line networking services that allow users to learn about other users and possibly network with such other users, such as Facebook.com, MySpace.com, Friendster.com, Orkut.com, and Plaxo.com. An online social network allows an individual to easily keep track of relationships that the individual has with other people by leveraging the Internet. Evite.com allows users to send invitations for specific events to specific individuals selected by the user. Other invite or event related sites include Meetup, Meeting Wave, Pinng, MyPunchBowl, Amiando, Invitastic, Madelt, Socializr, ipartee, Renkoo, ImThere, Skobee, Zvents, Zoji, and Windows Live Events. MeetingWave.com is an online tool for networking off-line for business or social purposes. The site provides a way for users to arrange meetings with the people they'd like to meet—anytime, anyplace—whether traveling or near home or work while providing control, privacy and flexibility.

Although an ever-growing number of commercial and social transactions take place across electronic mediums, little if anything has been done to assist users of those mediums ensure that other parties to those transactions are who they purport to be. That is, users of Web-based social networking sites, job sites, dating sites, chat rooms, blog comments, review sites, rating sites, consumer-to-consumer commercial transactions sites, and a myriad of other, so-called Web 2.0 sites, have few, if any, means for verifying the identities or attributes of those they interact with in the on-line world. Telephone calls with caller ID provide confidence that the telephone call is coming from the displayed phone number, because your phone service provider has authenticated the caller's identity. But there is no established means to authenticate the identity or background information of someone who contacts you through the Internet. With the prevalence of social networking websites, over 500 million people are registered on just the five most popular sites. Due to the total anonymity of the Internet, this is a serious problem for all users of the Internet; there are unlimited opportunities for predators to impersonate someone. The increasing adoption of online social networks has increased issues relating to identity theft, privacy and fraud.

Users connected to a network (e.g. internet, mobile, instant messaging, etc.) often use fictitious screen names as unique handles ("usernames" or "screen names") to identify themselves to other users. An individual user may have multiple screen names. Users communicate online with these fictitious identities either in online text messages, referred to as instant messaging (IM), or in voice, with special voice over IP software applications like Skype, without knowing the true identities of the other parties. This protects the identity of the users as long as users do not give out any private information, such as full names, telephone numbers, email address or other contact information. Anonymity is a significant driver for Internet use. As a result, social networking sites are resistant to any solution that reveals the identity of its users or in any way jeopardizes the anonymity. However, without some form of verification of a user's profile information or published or shared personal characteristics, some users are enabled to falsely portray their own personal characteristics, for example, occupation, education, group membership, affiliations, etc.

US Patent Publication No. 20090265639 to Shuster, hereby incorporated by reference (particularly the systems and methods described in paragraphs 0008-0048), describes systems and methods for verifying user personal characteristics. The method includes: receiving from a first user on a social network personal information about the first user; requesting veracity feedback of one or more items of personal information of the first user from a plurality of users on the social network; assigning a confidence score (also called a veracity score) to each item of personal information based on respective veracity feedback provided by one or more of the plurality of users; and publishing, on the social network, the confidence score of the first user's personal information to one or more users of the social network. One disadvantage of this method and system of generating a "veracity score" for each user is it requires active participation and scoring by other users. Moreover, such a system can be gamed by a single user signing up multiple user accounts and inflating the user's "veracity score".

Existing technology fails to provide a verification or a risk profile to enable persons accessing a social network, website or other computer-based application to determine the likelihood that people they are interacting with actually have claimed personal attributes, such as, for example, the claimed employment, profession, education, memberships and affiliations.

The present invention provides methods and systems that allow users of online social networks or other websites to better assess the identity or published profile of other users and to improved methods and systems for facilitating meetings between new people.

SUMMARY OF THE INVENTION

One aspect of the invention relates to improved systems and methods that allow one or more individuals ("inviting individual" or "inviter" or "available" or "Let's Meet" users) to meet or otherwise network or connect or transact or exchange information, tangibles or intangibles with other individuals. The improvements of the present invention can be applied to or used with the systems and methods set forth in U.S. Pat. Nos. 6,963,900 and 7,483,946, U.S. application Ser. No. 12/286,565, International Application PCT/US2007/

076955, filed Aug. 28, 2007 (now PCT Patent Publication WO 2008/030729) and those set forth in U.S. application Ser. No. 12/396,456, filed March, 2008, commonly assigned and hereby incorporated by reference, specifically, the systems and methods that allow one or more individuals ("inviting individual" or "inviter") to meet or otherwise network or connect or exchange information, tangibles or intangibles with other individuals by creating and posting an electronic invitation including proposed meeting information (e.g., a specified time or time range, specific location or general location (e.g., neighborhood, zip code), purpose, etc.) or a request for an invitation or post a "Let's Meet" or "Available" indication at a website or other electronic location accessible by other users via the Internet or other computer-based network and allowing other individuals to review such invitations or requests or indication and, if confirmed, result in a meeting.

Another aspect of the invention relates to methods and systems for verifying, authenticating, and/or rating the identity or profile characteristics of users of online social networks and other websites and applications. One embodiment relates to systems and methods of verifying users on social networks and other websites or applications by deploying click thru email verification or other verification and publishing an indication of those verifications on the user's profile to demonstrate the level of verification and trustworthiness of the verified user to other users. Preferably, the indication is displayed to other users without disclosing the specific information relating to the verification. For example, preferably, the email domain is listed on a user's profile or other published space with an indication of being verified without disclosing or publishing the user's entire email address that was used for the verification.

Another aspect of the invention relates to mobile geolocation or location-based methods and systems for facilitating networking meetings with people based on a users location and meeting interests and novel monetization methods and systems.

Yet another aspect of the invention relates to improved systems and methods of generating "private label" versions of online tools for networking meetings that allow users with common interests, affiliations or other factors to meet, including improved methods of or systems for implementing said methods.

Other aspects as well as embodiments, features and advantages of the present invention will become apparent from a study of the present specification, including the drawings, claims and specific examples.

DESCRIPTION OF THE INVENTION

The methods of the invention may be performed using one or more computers in communication with a plurality of clients/mobile device apparatuses and running application software to perform the recited actions. The computing environment should not be interpreted as having any dependency or requirement relating to any one or combination of components illustrated in the exemplary operating environment.

The invention may be operational with numerous other general purpose or special purpose computing system environments or configurations, preferably running or including software code enabling the methods and functionality. Examples of well known "terminals" or computing systems, environments, and/or configurations that may be suitable for use with the invention include, but are not limited to, personal computers, server computers, mobile devices, tablets, handhelds or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types or functionality. The invention may also be practiced in distributed computing environments where tasks are performed by remote processing devices that are linked through a communications network. In a distributed computing environment, program modules may be located in both local and remote computer storage media including memory storage devices. Suitable computer-based systems are described in U.S. Pat. No. 7,571,319 to Gillum et al., hereby incorporated by reference (specifically the description of the systems relating to FIGS. 1 and 7).

Figure 1:
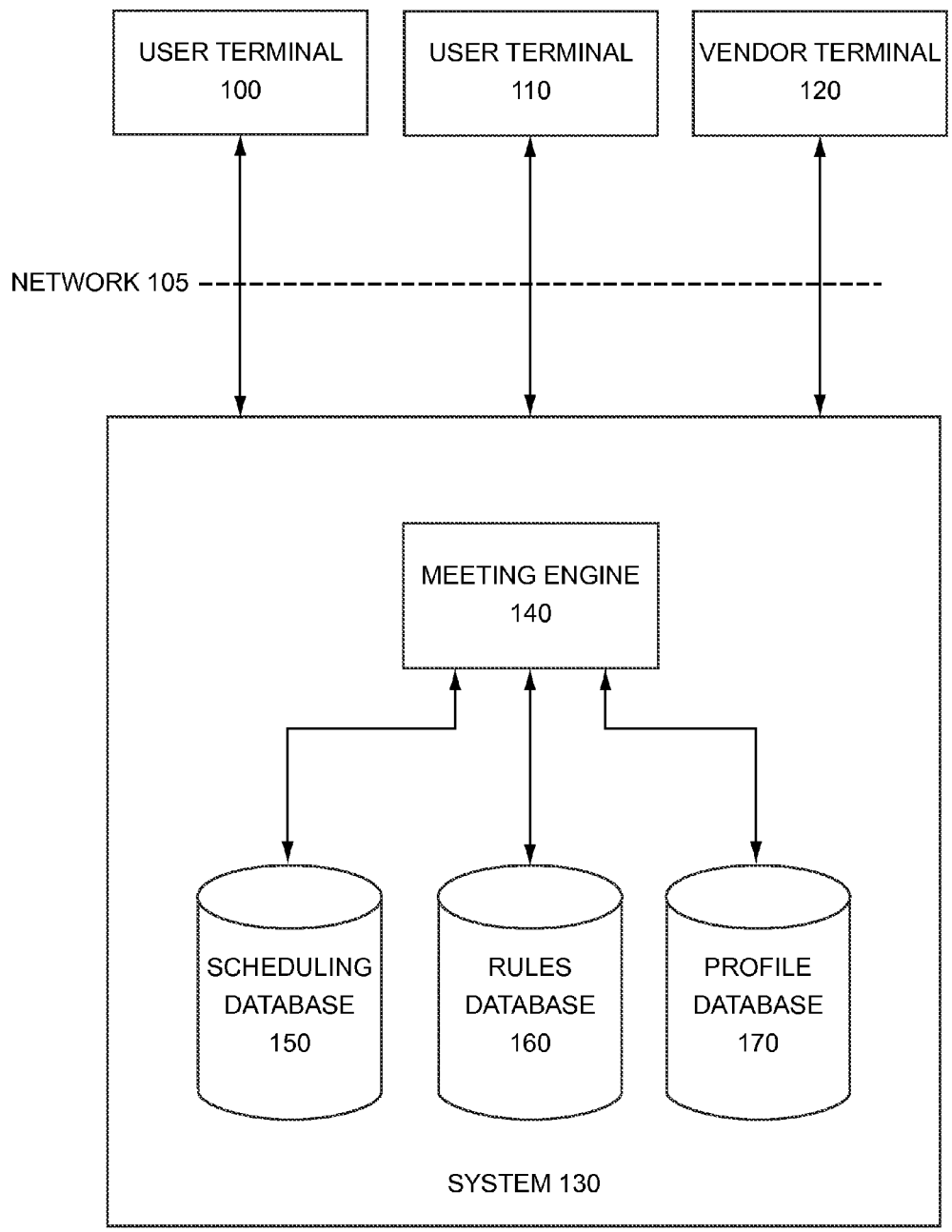
FIG. 1 is a block diagram that depicts a system architecture in accordance with an embodiment of the present invention.

FIG. 1 depicts a system architecture in accordance with an embodiment of the present invention. The architecture may include terminals operated by users (100,110) and/or vendors (120) in communication with the system (130) of the present invention, which may include a meeting engine (140) coupled with several databases that store invitation information (150), processing rules (160) and user/vendor profiles (170).

FIGS. 2-5 depict the application of rules by the meeting engine (140) of the system (130) in connection with invitation creation, acceptance, counterproposing and browsing. Similar systems or rules can be used for profile creation, profile editing, verification, indications of "available" or "unavailable", meeting requests, trace requests, and other methods described in this application.

Figure 2:
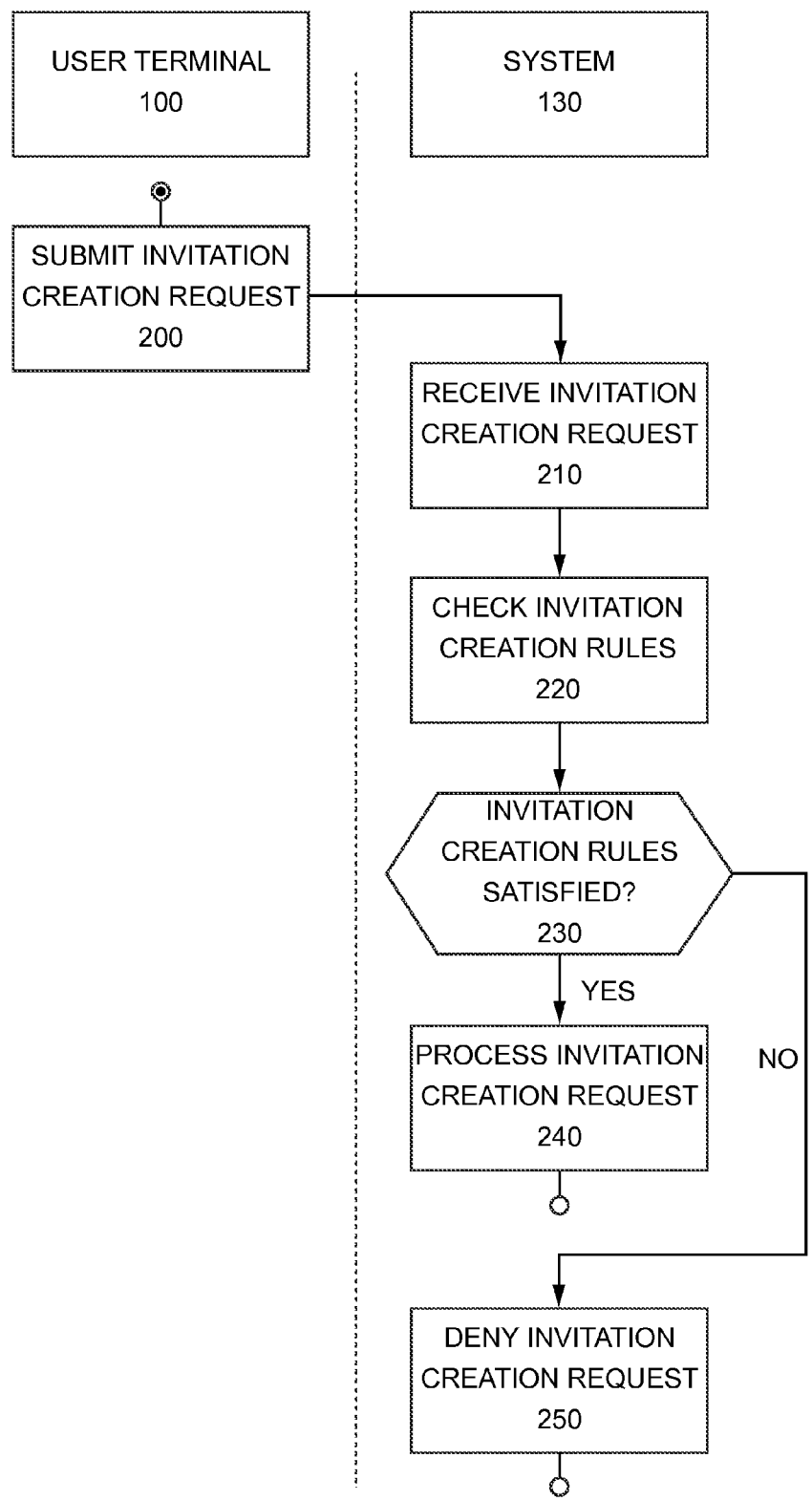
FIG. 2 is a process flow diagram for rule-based invitation creation in accordance with an embodiment of the present invention.

In FIG. 2, a terminal (100) operated by a user submits (step 200) to the system (130) a request over a network (105) to create an invitation for a proposed "meeting". The system (130) receives (step 210) the request and determines (steps 220, 230) whether one or more rules associated with invitation creation, such as those stored in a rules database (160), apply to the invitation creation request. The system (130) then processes (step 240) the invitation creation request if all determined applicable (e.g., required or necessary rules) rules are satisfied, and denies (step 250) the invitation creation request if any determined applicable rule is not satisfied. Preferably, when a second user accepts said invitation, the second user is charged a fee. Even more preferably, the fee is not charged unless the acceptance is approved by the first user who submitted the invitation thereby confirming a meeting. One preferred embodiment includes refunding said fee if the meeting is cancelled or the other member fails to attend and, preferably if verified, members are fined if fail to attend a confirmed meeting.

Figure 3:
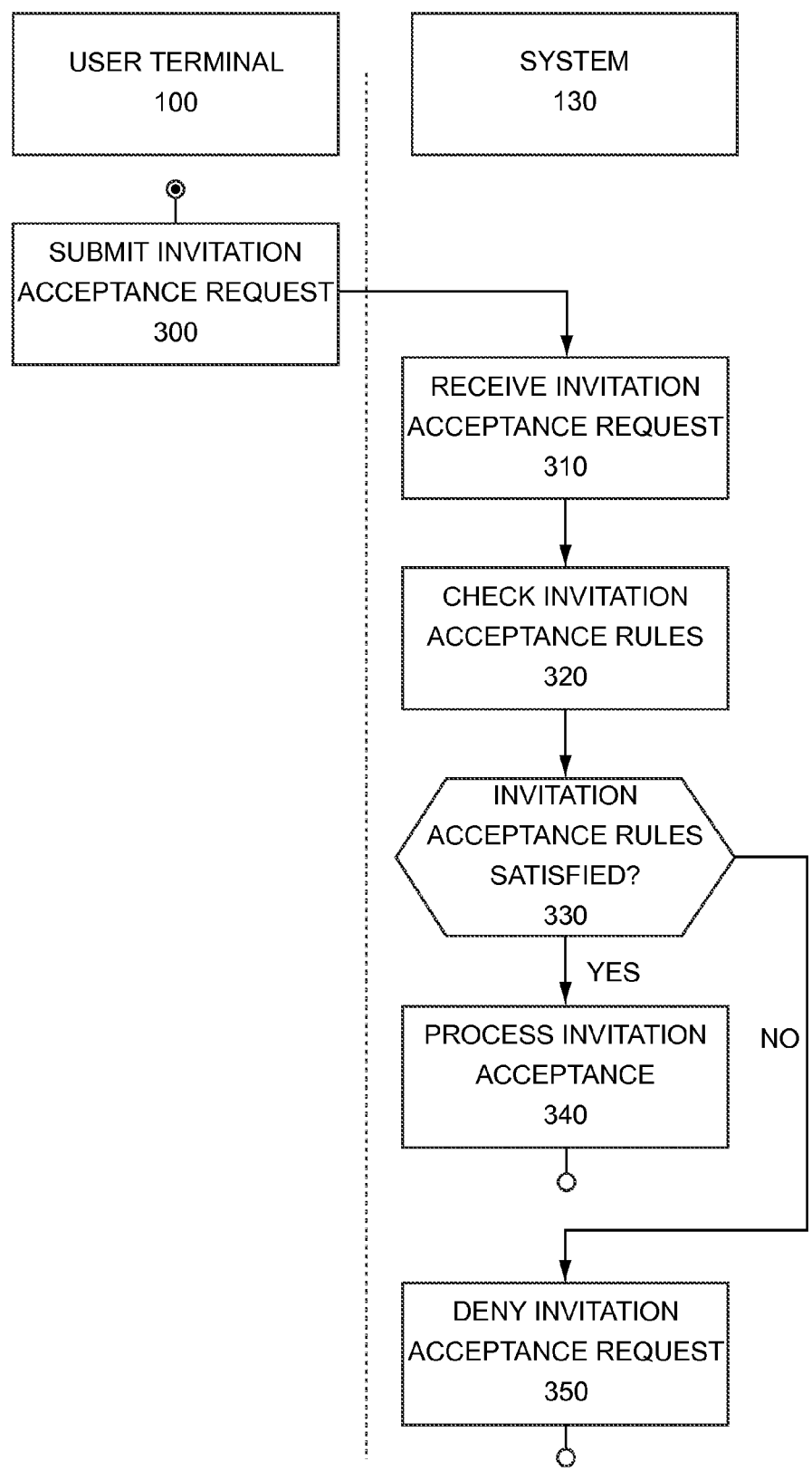
FIG. 3 is a process flow diagram for rule-based invitation acceptance in accordance with an embodiment of the present invention.
Figure 4:
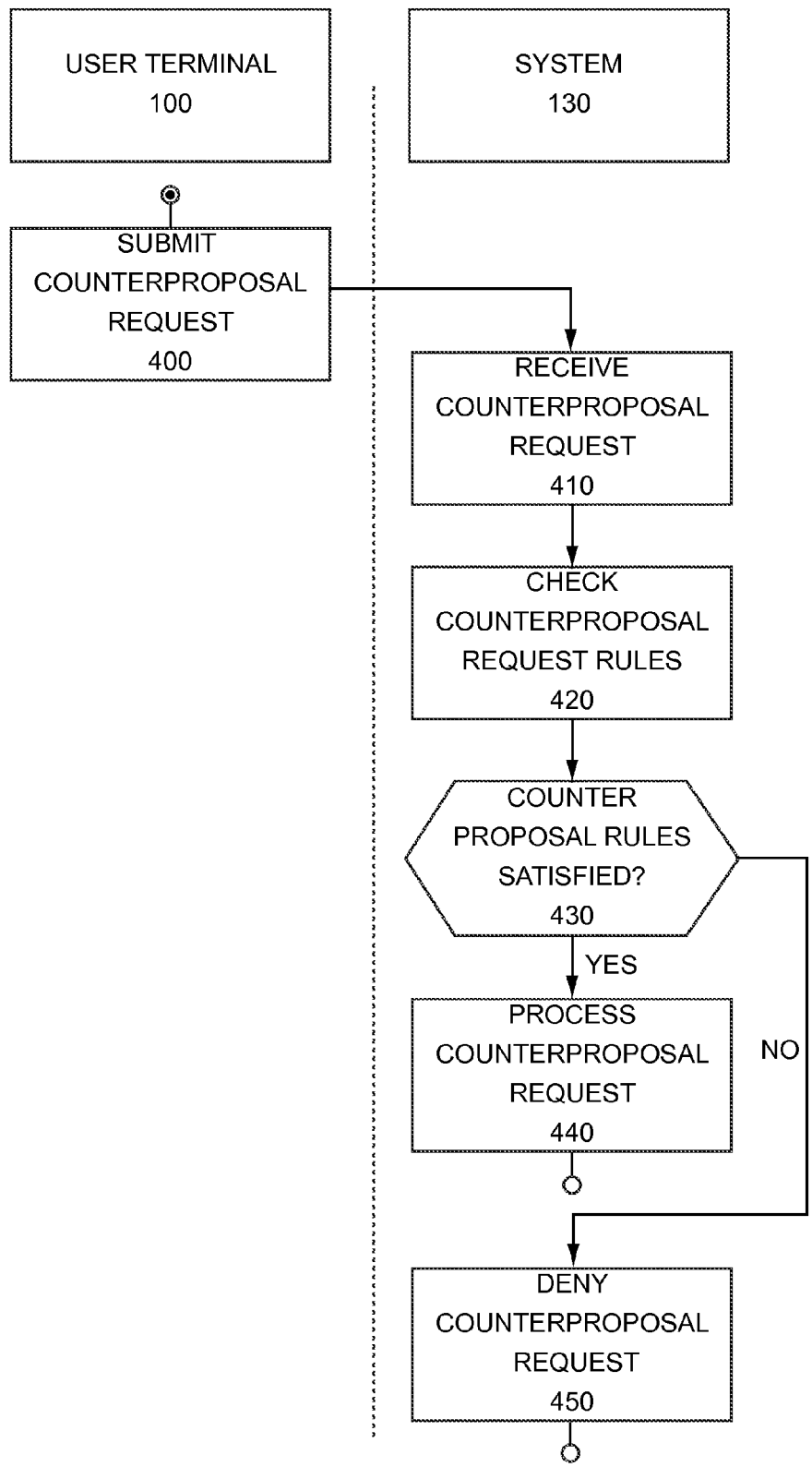
FIG. 4 is a process flow diagram for rule-based invitation counterproposing in accordance with an embodiment of the present invention.
Figure 5:
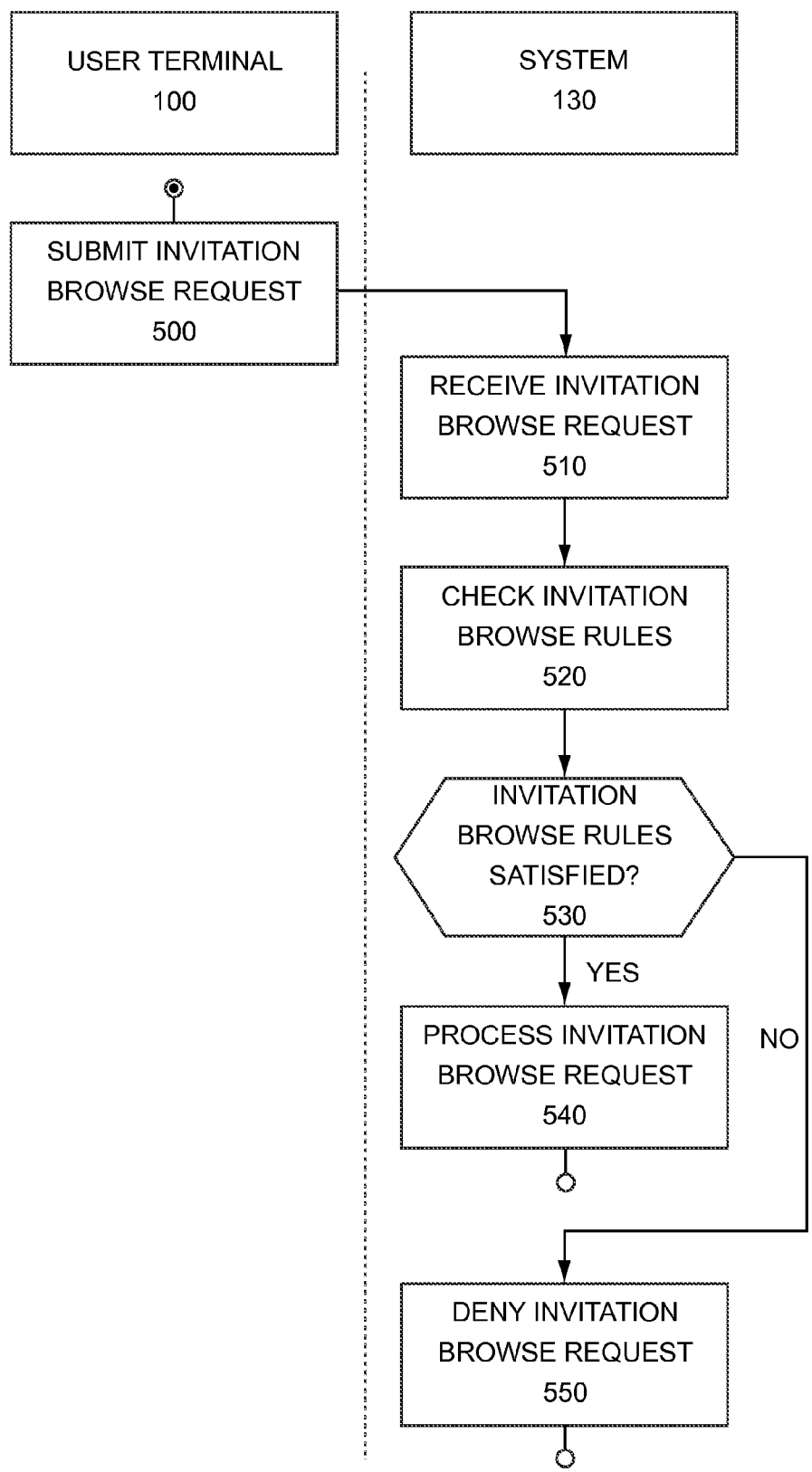
FIG. 5 is a process flow diagram for rule-based invitation browsing in accordance with an embodiment of the present invention.

FIGS. 3-5 depict similar steps in connection with invitation acceptance, counterproposing and browsing, respectively. In FIG. 3, a terminal (100) operated by a user submits (300) a request to accept an invitation. The system (130) receives (step 310) the request and determines (steps 320, 330) whether one or more rules, such as those stored in the rules database (160), apply to the request to accept the invitation. The system (130) then processes (step 340) the invitation acceptance request if all the applicable rules are satisfied, and denies (step 350) the invitation acceptance request if any applicable rule is not satisfied. Preferably, the user is charged a fee to submit the request, more preferably, is charged only if the acceptance is approved by the invitor.

In FIG. 4, a terminal (100) operated by a user submits (400) a request to make a counterproposal to an invitation or sends a meeting request to another user for a proposed meeting. The system (130) receives (step 410) the request and determines (steps 420, 430) whether one or more rules, such as those stored in the rules database (160), apply to the request to make the counterproposal. The system (130) then processes (step 440) the counterproposal or other request if all the applicable rules are satisfied, and denies (step 450) the counterproposal or other request if any applicable rule is not satisfied. Preferably, the user is charged a fee to submit the request, more preferably, only charged if the request is approved by the other user confirming the meeting.

In FIG. 5, a terminal (100) operated by a user submits (500) a request to browse for invitations. The system (130) receives (step 510) the request and determines (steps 520, 530) whether one or more rules, such as those stored in the rules database (160), apply to the request to browse for invitations. The system (130) then processes (step 540) the browse request if all the applicable rules are satisfied, and denies (step 350) the browse request if any applicable rule is not satisfied. According to another embodiment, the user can request a location-based "trace" that searches for "available" users (users being able to specify "available" or "unavailable", with the "available" users showing up in trace searches requested by other users) in the specified radius or area relative to the user (e.g., within 1 mile, within 5 miles) and being able to send a "meeting request" to one or more "available" users. Preferably, the user is charged a fee to submit the request, more preferably, only if the request is approved by the other user confirming the meeting. Preferably, users can select to be "unavailable" but opt to be included in other user's search requests, more preferably such other users can "watch" such unavailable user and be notified when "available" to they can send a meeting request.

The rules described in FIGS. 2-5 may derive from preferences stored in profiles (170) associated with users and/or vendors affiliated with the system (130), security criteria, and other situations as described below for example.

Figure 6:
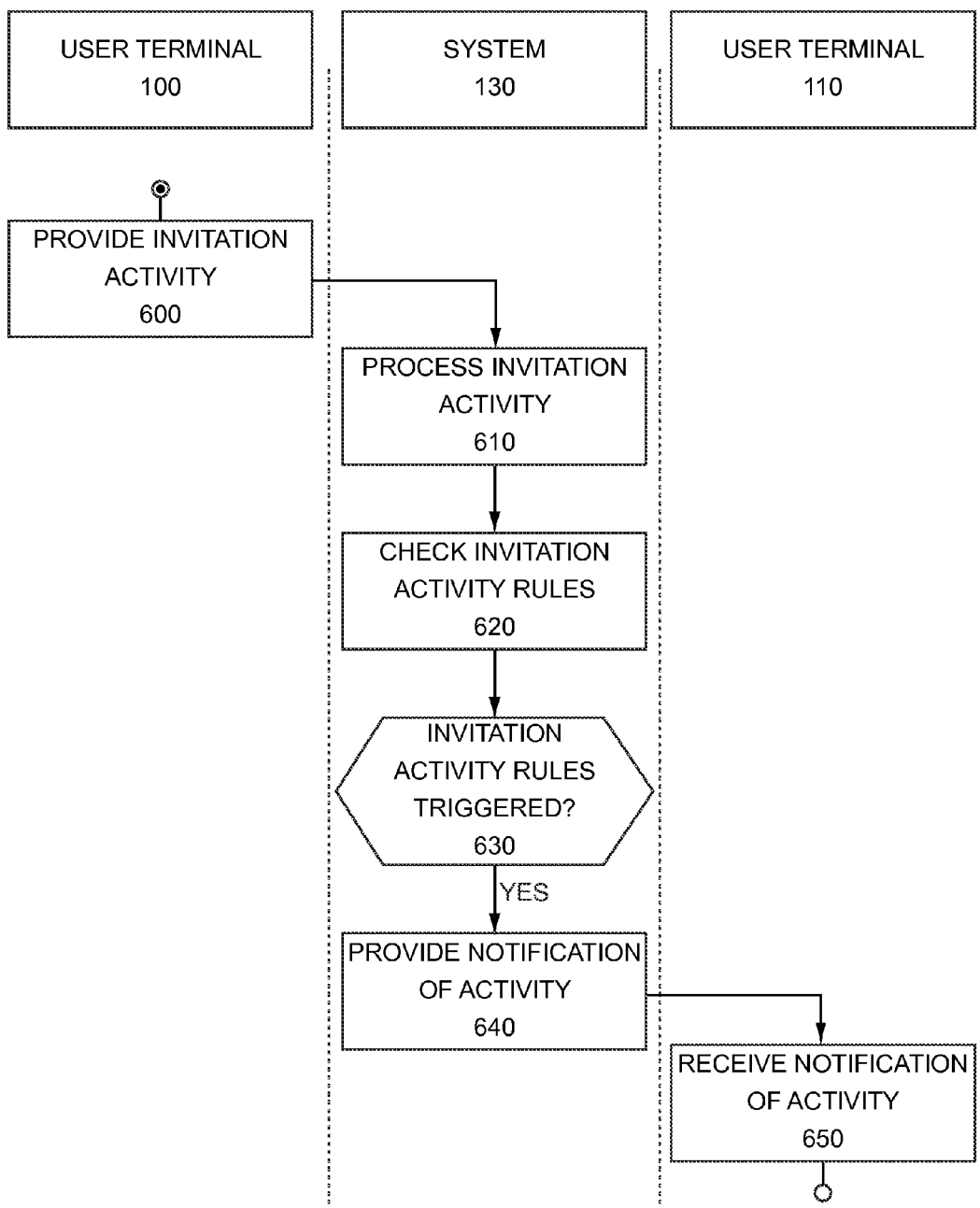
FIG. 6 is a process flow diagram for rule-based invitation activity notification in accordance with an embodiment of the present invention.

FIG. 6 depicts how a user of the system (130) may express a preference for and receive notification of invitation activity pertaining to invitations of other users or other user activity that are not related to the inquiring user. Invitation activity may include the posting of an invitation or the acceptance of an invitation by another user, or the posting of an invitation having certain characteristics or keywords (e.g., any invitation for Web 2.0 programmers) or an indication available to meet. For example, a user may wish to be notified when a certain other user (e.g., a user the first user wishes to meet or meet again) posts an invitation or accepts an invitation of another, in which case the first user may be notified so the first user can decide whether to participate in the same "meeting". Preferably, the notifications are by email, RSS, SMS, IM or the like.

In FIG. 6, a terminal (100) operated by a user provides (step 600) to the system (130) a request over a network (105) to process an invitation for a proposed "meeting", which may include, for example, drafting, creating, editing, accepting, or counter proposing to the invitation. The system (130) processes (step 610) the request, and determines (steps 620, 630) whether the request applies to one or more notification rules set up by a different user unrelated to the processing of the invitation. For example, a notification rule can include a request that the user be notified if a specific user posts or accepts an invite and/or if an invite having certain characteristics is processed (e.g., specific keyword, location and/or "meeting" purpose). Preferably, the notification employs email, RSS, SMS, IM or the like. It then provides (step 640) to the different user (step 650) a notification in accordance with any determined applicable rule. The notification rules may also derive from preferences stored in profiles (170) or user accounts or other public displays associated with users and/or vendors affiliated with the system (130), and examples of such notification rules are provided below.

Figure 7:
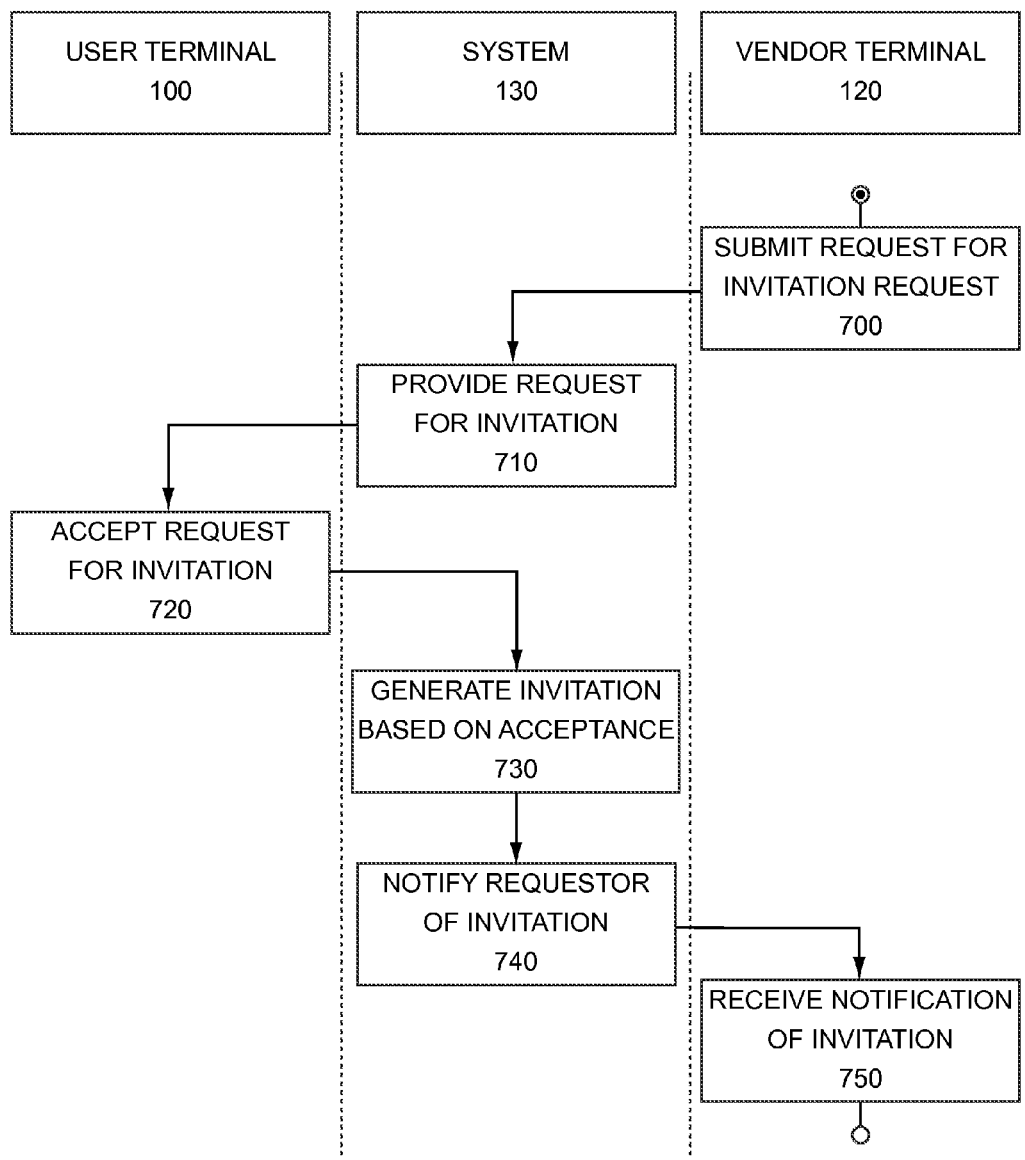
FIG. 7 is a process flow diagram for requests for invitations in accordance with an embodiment of the present invention.

FIG. 7 depicts how vendors may advertise by requesting invitations through the system (130). In FIG. 7, a terminal (120) operated by a vendor submits (step 700) to the system (130) a request over a network (105) for an invitation for a proposed "meeting". The system (130) provides (step 710) the request for the invitation to other users. Responsive to a terminal (100) operated by a user accepting (step 720) the request for the invitation, the system (130) generates (step 730) the invitation for the proposed "meeting," and notifies (step 740) the vendor (step 750) of the invitation. The initial request for the invitation provided to the other users may be in the form of an online advertisement such as a banner ad, for example, as described below.

Figure 8:
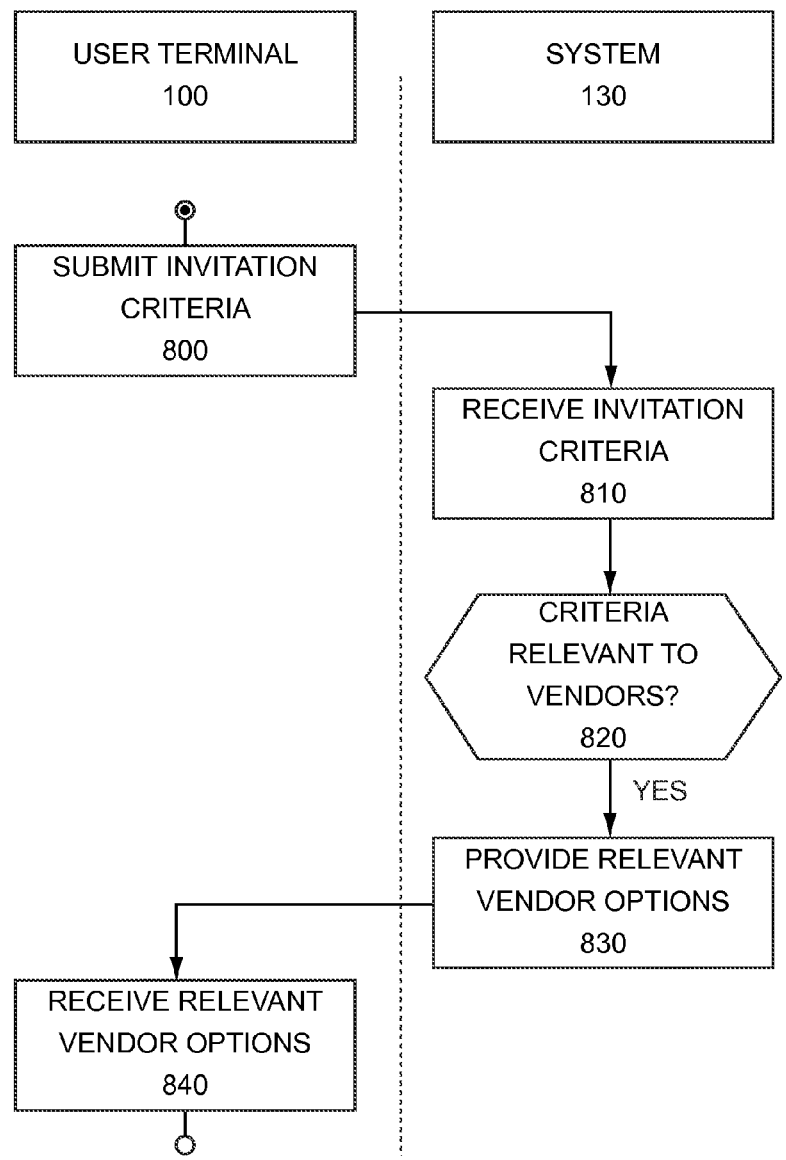
FIG. 8 is a process flow diagram for integrating vendor options into invitations in accordance with an embodiment of the present invention.

FIG. 8 depicts the integration of vendor (commercial user) service options into invitations. In FIG. 8, a terminal (100) operated by a user submits (step 800) to the system (130) criteria over a network (105) associated with an invitation for a proposed "meeting". The system (130) receives (step 810) the invitation criteria and determines (step 820) whether it is relevant to one or more services provided by one or more vendors. The system (130) then provides (step 830) the user (step 840) with an option to select any of the determined relevant vendor services in connection with the invitation. Embodiments of this functionality are provided below. A vendor or commercial user is a user of the system who is seeking to sell or otherwise commercialize goods or services to other users.

One aspect of the invention relates to improved Web-based social networking sites, job sites, dating sites, chat rooms, blog comments, review sites, rating sites, consumer-to-consumer commercial transactions sites, and a myriad of other, so-called Web 2.0 sites or mobile applications, where users are able to better verify the background information of other users without users disclosing personally identifiable information such as full name, email address, etc. The present invention preferably permits users of online social networks and other websites to freely communicate with each other without the loss of privacy or disclosing each other's email addresses while, at the same time, being able to access each other's identities based on verified email addresses or other verified information. Suitable verifying methods and verifiable information is described in US Patent Application Publication No. 20030212790 to Thambidurai et al. (specifically, those set forth in paragraphs 0007, 0030 and 0040-0042), hereby incorporated by reference. See also, US Application No. 20090228294 to Choi et al., hereby incorporated by reference, which describes a quantitative measure of a trustworthiness of a self-asserted attribute of an individual determined through a combination of analysis of a social network of which the individual is a member and non-network based analyses, and reporting said measure.

According to one embodiment of the invention, systems and methods are provided that authenticates or verifies the identity or background information of a first user and stores that information in a database or other electronic format in a manner that allows a second user communicating on a social network with the first user (or viewing the first user's comments, ratings, reviews etc.) to confirm that the identity or background of the second person has been verified without requiring the first user to reveal identity information (other than their user name/screen name) to the second user and vice versa. This allows users of a social network, website, or other computer-based application to have a better understanding of who the other users are without having to disclose a user's identity information (e.g., full name, email address, etc.).

When social networking on or otherwise surfing on or using the Internet or other computer-based network, people generally identify themselves by a screen identifier or username (e.g., JoeUser2) that provides anonymity and does not reveal any identity information and the system connects the person's screen identifier with their actual identity or account information (e.g., full name, email address, etc.), without compromising their privacy. The present invention is also applicable beyond social networking sites to authenticating all users on the Internet. Other sites may interact with the components of the system in the same manner as a social network server, including job sites, dating sites, chat rooms, blog comments, review sites, forums, Question/Answer and message boards, rating sites, consumer-to-consumer commercial transactions sites, and a myriad of other, so-called Web 2.0 sites or mobile applications.

According to another embodiment of the invention, users are requested to provide a valid email address to register on the website or application and a verification email is sent to the user at the email address that is provided. The user is required to click through or otherwise confirm that the verification email was received (e.g., retrieving a code and inputting on the site or clicking through a link on the email). After the user has verified the email, the user's profile includes a display or other indication of the email domain for the verified email address (e.g., for the email address joesmith@example.com, example.com is the domain). This allows other users to see that the user have verified email addresses with the displayed email domains indicating the user is associated with the university, company or other association. For example, a user may verify a .edu email address (e.g., johnsmith@harvard.edu) thereby confirming the user is associated with the school and either @harvard.edu or harvard.edu or other indication is displayed on the user's profile for other users to view. Or, a user may verify using a company email address (e.g., john.smith@ibm.com) thereby indicating associated or employed by the company and either @ibm.com or ibm.com or other indication of the verification is displayed on the user's profile for other users to see. Other indications include a characteristic, trait or other descriptor relating to the verification without disclosing the email domain. For example, indicating the user verified an email address associated with an "Ivy League" school or a Fortune 100 company rather than display the specific email domain associated with the school or company. Preferably, the method and system allows the user to select the type of indication displayed for each verification (e.g., the user may not only select to display the email domain for a school or other entity, but can also select to display simply "NASDAQ listed" or "Certified Charity" or other symbol or identifier or descriptor for company or entity the individual is verified to be affiliated with).

According to one embodiment, upon arriving on the web site or application, the user is provided with an option to sign up for the service. If the user decides to sign up for the service, a form is presented to the user requesting additional information to be used for the service. The information may include, but is not limited to: (a) name, (b) username or screen name, (c) email address, and (d) PIN or password for accessing the service. Preferably, the registration process includes a verification step. According to one preferred embodiment, the verification process includes the user providing a valid email address, a verification email being sent to that email address and the user can open and click thru or otherwise confirm the verification email was received, and than an indication of the verification is displayed or otherwise associated with the user's profile or account. Other verification methods may include inputting a specific code or registration number or clicking through a link from a specified website (e.g., a password protected alumni or conference or association website). For example, if a user is a registered attendee to a conference, the user may be provided with a registration number to verify registered to attend the conference or trade show and an indication of such verification is associated with the user's profile. According to preferred aspects of the invention, an indication of the verification is associated with the user's account, preferably the user's profile.

Preferably, the member can update his or her profile data at any time through the web or mobile interface. Preferably, the member can verify one or more email addresses (or other verification methodologies) and the email domain of each verified email address is displayed on the member's profile for other members to view. Preferably, the member can select which domain will be displayed on the member's profile. Preferably, the member can select which email address should be used for email notifications and which should be used for display on the member's profile.

Preferably, the member receives regular followup verification requests for verified emails to confirm still verified. For example, "John Smith" may have formerly worked at IBM and had a verifiable email address john.smith@ibm.com so the email domain @ibm.com or ibm.com or other verification indication was displayed on his profile. However, if the user leaves IBM than the user would no longer be able to verify the email address. Accordingly, preferably a regular verification email (e.g., weekly, monthly, quarterly, yearly) is sent to each verified email domain that is displayed on the Profile and if the member fails to verify the email within a specified period of time, the email domain is no longer displayed on the user's profile. Preferably, the last verification date is displayed for each domain or other verification indication listed on the profile or otherwise visible to other users.

According to one preferred embodiment, the method or systems recognizes email domains that are likely to change for the user compared to more permanent email domains. For example, a verified email domain associated with a company may require re-verification periodically, while an email domain indicating alumni status would not require re-verification since that attribute or characteristic is permanent and not subject to change.

According to another preferred embodiment, formerly verified email domains can be labeled as formerly verified on the user's profile to indicate historical associations. Preferably, the user can select which historical associations the user can keep displayed on their profile. Preferably, the display or indication of the formerly verified email domain includes the dates the verification was valid. For example, a date range to indicate when the user was associated with the email domain (e.g., a company's email domain) such as the date of first verification and the most recent re-verification.

According to one embodiment, other users can "request" a verification email be sent to their email addresses to update their verified dates. Preferably, when viewing a user's profile, a member can select to have the service send another verification email for previously verified email domains. According to another embodiment, a member can delete verified emails or other verifications from their account and associated indications removed from their profile or other public display. According to another embodiment, the user can delete one or more indications from their profile or other public display associated with the user without deleting from their account.

Preferably, such other public display may include indications displayed with usernames, user comments, user questions, and other online user activities where a screen name, username or other user indication is displayed to other users.

One embodiment relates to a method of registering a user to a computer-based or mobile social network or other website or application comprising:
(a) receiving by a server an action request from a user to register;
(b) receiving a email address from said user;
(c) sending a verification email to said user's email address;
(d) receiving confirmation of receipt of said verification email from said user; and
(e) displaying an indication that said user verified said email address on said user's profile or other public display without displaying said email address.

Preferably, said indication includes a display of said email domain of said email address. Preferably, the method includes the steps of verifying a second email address from said user and displaying an indication of said second verification on said user's profile (e.g., a user may verify an email address for work and another for the college the user graduated from).

Another embodiment relates to a method comprising:
(a) receiving a email address from a user;
(b) sending a verification email to said user's email address;
(c) receiving confirmation of receipt of said verification email from said user; and
(d) displaying an indication that said user verified said email address on said user's profile or other public display associated with the user without displaying said email address.

Another embodiment relates to a method comprising:
(a) verifying a user's email address; and
(b) displaying an indication that said user verified said email address on said user's profile or other public display associated with the user without displaying said email address.

Another embodiment relates to a method comprising:
(a) receiving verification information from a user; and
(b) displaying an indication of said verification on said user's profile or other public display associated with the user without displaying details regarding said verification information.

Another embodiment of the invention relates to a method for generating a computer-based user profile or other public display associated with the user comprising displaying an indication of an email verification on said user's profile or display (e.g., a user may verify an email address for work or another for the college the user graduated from), preferably said indication including said email domain without disclosing said email address.

Another embodiment of the invention relates to a computer-based method for registering a user to a social network, website or application comprising:
receiving by a server a request from a first user over a network to register including an email address;
determining whether one or more rules associated with registration apply to the request from the first user;
processing the request if all rules determined to be applicable are satisfied; and
denying the request if one or more rules determined to be applicable are not satisfied;
wherein: said method further comprises generating a profile or other public display associated with the user for said first user with an indication of said first user's email address or other indication of the verification of the user's email address. Preferably, said indication includes a display of said email domain of said email address or other indication without displaying said email address.

Yet another embodiment relates to a method for authenticating or verifying the identity or background information of a person on a online social network or other computer based website or application operating on the Internet or other computer-based network (including mobile application, widgets, etc.), comprising the steps of:
obtaining identity information or background information of a first person;
comparing the identify information or background information to information at a trusted identification server to authenticate the identity or background information of the first person;
if authenticated, storing the identity or background information in a first database;
receiving a request from a second person for information relating to said first person; and, transmitting to the second person information relating to said first person including an indication that said identity or background information of said first person has been verified without disclosing said identify or background information. Preferably, said information includes the email domain of said first user's verified email address without disclosing said email address.

Preferably, said method further comprises the steps of: adding a widget to a social network page or profile page or related page of the first person. Preferably, also allowing the second person to determine whether identity or background information of said first user has been authenticated by accessing the database by way of said widget, preferably without disclosing the email address or other detailed information relating to said first user. Preferably, the widget displays indications of verifications.

Yet another embodiment relates to a computer readable medium storing computer executable instructions that, if executed by a computer, cause the computer to perform a method comprising: receiving from a first user of a social network or other application personal information items describing the first user and publishing, using the social network application, a verification indication relating to said first user's personal information items to one or more other users of the social network application. Preferably, said indication includes a display of said email domain of said email address or other indication without displaying said email address. Another embodiment relates to a system comprising one or more computers and including said computer readable medium.

Yet another embodiment of the invention relates to a comment system or methods for allowing users to create comments or reviews whereby the users may register using one or more verified email addresses and an indication of said verified email addresses is displayed when the user's comments or reviews are provided to others and/or an indication of the user's associations or background, preferably without disclosing the user's personally identifiable information. The invention can be applicable and used with conventional commenting, chat rooms, ratings, review and feedback systems and methods such as those set forth in US Patent App No. 20070127693 to D'Ambrosio et. al., US Patent Application No. 20070033092 to Jams, and US Patent Application No. 20070021973 to Stremler, each hereby incorporated by reference.

Yet another embodiment relates to a computer-based system for generating a profile or other display for a first user, the system comprising: a user interface for interacting with said first user; a network connection; a persistent storage; a memory for storing software instructions; and a processor operatively connected to the memory, the processor for executing the software instructions; wherein the software instructions enable the processor to: receive verified information relating to said first user; retrieve a profile file for the first user from the persistent storage; transform the verified information into a verified display by applying the functional transformation, wherein said verified display does not include detail information (e.g., email address) relating to said verified information.

A still further embodiment of the invention relates to computer program products comprising software instructions for carrying out the steps in one or more of the above methods. Preferably, the products include: a user interface for interacting with a user; a network connection; a persistent storage such as a database; a memory for storing software instructions; and a processor operatively connected to the memory, the processor for executing the software instructions; wherein the software instructions enable the processor to carry out the method steps described above.

The method can also be implemented as machine executable instructions executed by a programmable information processing system or as hard coded logic in a specialized computing apparatus such as an application-specific integrated circuit (ASIC). Suitable related systems suitable for implementing the methods and systems of the invention are described in U.S. Pat. No. 7,509,230 to Fernandez et al. (see description of FIGS. 1 and 2 in the specification); US Patent Application Publication No. 20080120166 to Fernandez et al. (see description of FIGS. 1 and 2 in the specification); and US Patent Application No. 20080126344 to Hoffman et al., which describes methods and systems of rating the reputation of email addresses, such methods and systems hereby incorporated by reference (specifically paragraphs 0036-0040).

Another aspect of the invention relates to methods and systems for generating or managing "private label" or "white label" versions of online or mobile tools for arranging networking meetings among users with common affiliations or associations (e.g., fellow alumni, conference attendees, trade show attendees, hotel guests, etc). Preferably, the private label version allows individuals with common interests or affiliations to arrange networking meetings with each other in a closed format. According to another embodiment, the version is semi-closed in that all invites for networking meetings are created by individuals with common associations or affiliations (e.g., members of a law firm, representatives of a company, etc.), which others outside the group (e.g., the public) can accept the invites.

According to one embodiment, a private label version is generated at the request of an individual or entity by providing one or more verification or authentication methodologies (e.g., specified email domains for email address verification, registration numbers or codes, clickthru links, etc). Preferably, one or more email domains may be associated with the private label allowing users to use the private label version upon email verification. According to an alternative embodiment, a private label version may be generated without requiring a user verification step (e.g, an open or public private label). Preferably, the version's invites may be open or displayed to users outside the private label (e.g., published. For example, a private label version for a restaurant franchise may allow visitor's to the franchises's website to register and create invites for networking meetings at the franchise's restaurant and such invites could be published outside the franchises's private label to pull in additional customers to the restaurant. Alternatively, the franchise may choose to only publish such invites on the franchises' private label.

According to another embodiment, a private label version is generated at the request of an individual or entity by providing one or more of the following: (a) logo or design; (c) copy or other customization; (c) payment of a fee; (d) verification or authentication methodologies (e.g., specified email domains for email address verification, registration numbers or codes, clickthru links, etc). Preferably, one or more email domains may be associated with the private label allowing users to use the private label version upon email verification.

According to one preferred embodiment, the systems and methods allow a private label generator to choose one or more of the verification methodologies: (a) specified email domain verification; (b) registration code or number verification; (c) directional link verification (e.g., link to private label provided behind a wall); (c) user name or other identification verification; and/or (d) no verification required.

According to another embodiment, private label members can opt into a non-private or open or public version of the service. Preferably, members can "belong" to one or more private labels. For example, an individual user may belong to different private labels for the member's undergraduate alumni association, graduate school (e.g., law school or business school), and for a trade show or conference the member is attending. Preferably, the members can enter and exit into and out of such private label version. Preferably, members can cancel "memberships" to said private label versions if no longer applicable or no longer of interest. Preferably, the member gain access to each new private label upon establishing verified to enter and use (e.g., by providing an authorized email address, registration code, etc.).

According to another embodiment, the private label is for a conference or trade show and user membership to such private label is terminated after the end of the event. Preferably, members are able to arrange meetings with other members after the conference/trade show is over.

According to one preferred embodiment, member's profiles or account are labeled with a special tag that indicates the member is verified to enter a private label. For example, a user's profile may be tagged with #group_Harvardalumni and #group_ABAConf2010 to indicate the user is an authorized member of those two private label versions.

According to another embodiment, a private label version is created at the request of a private label requester. Preferably, the private label requester can provide the verification procedure for verifying a user to use the private label. For example, the private label requester can request that user enter a specified code or sign up with an approved email domain or require no verification (e.g. open or public). For example, a private label requester that is an alumni association requesting a private label for alumni may request users provide a valid, verified email address that includes an alumni email address (e.g., alumni.columbia.edu). Or a conference or trade show organizer may request that users provide a registration number or other code. Another example would include a hotel private label which would require a guest number or other verification the user is a guest of the hotel before being allowed to register and arrange meetings with other hotel guests at the hotel's restaurant, bar, golf course or other hotel venue.

Another embodiment of the invention relates to a computer-based method for registering a user to a social network, website or application comprising:

receiving by a server a request from a first user over a network to register including an email address;

determining whether one or more rules associated with registration apply to the request from the first user;

processing the request if all rules determined to be applicable are satisfied;

and denying the request if one or more rules determined to be applicable are not satisfied;

wherein said registration requires the verification of a valid email address having a specified email domain. Preferably, said first user can perform additional registrations using additional email addresses with different approved email domains. Preferably, said verification is indicated on the user's profile or otherwise associated with the first user without disclosing the email address preferably using the methods and systems described above.

Another embodiment of the invention relates to a computer-based method for registering a user to a "private label" or "white label" version of a social network, website or application comprising:

receiving by a server a request from a first user over a network to register including an email address;

determining whether one or more rules associated with registration apply to the request from the first user;

processing the request if all rules determined to be applicable are satisfied;

and denying the request if one or more rules determined to be applicable are not satisfied;

wherein said registration requires the verification of a valid email address having an specified email domain. Preferably, said first user can perform additional registrations using additional email addresses with different approved email domains. Preferably, said verifications are indicated on the user's profile or otherwise associated with the first user without disclosing the email addresses.

Preferably, said method further comprises generating a profile or other public display for said first user with an indication of said first user's email address. Preferably, said indication includes a display of said email domain of said email address (e.g., "oracle.com" or "@oracle.com") or other indication.

Another aspect of the invention relates to improved computer-based methods and systems for location-based networking.

One embodiment of the invention relates to a computer-based methods and systems for providing location-based networking allowing a first user to select to be identified to other users as being "available" or "unavailable" for networking meetings. Preferably, when said first user selects "available", the first user will show up on "trace" requests or searches performed by a second user which will display "available" users based on the location of the second user. Preferably, the first and second user's locations are determined using GPS or other technology. See, for example, the methods and systems for determining location set forth in United States Patent Application No. 200100011081 to Crowley, hereby incorporated by reference. Preferably, a second user can view the profile of the first user on a trace and, if interested in meeting, can send the first user a "meeting request". The first user can accept or decline the meeting request, and a notification is sent to the second user of the first user's decision. Preferably, the first and second user can communicate via double-blind email only after the meeting is confirmed (e.g., the meeting request is accepted). Preferably the second user is charged a fee if the meeting request is accepted.

According to one preferred embodiment, the first user can select whether the first user will pay the fee or whether the fee will be paid by the user who sends a meeting request (or who accepts an invite posted by the first user). On the one hand, allowing the first user to pay the fee, entices other users since the meeting request or invite acceptance is free. On the other hand, requiring the second user to pay a fee reduces spam.

According to another embodiment, a user can select to be "available" or "unavailable", whereby an indication of "available" results in the user showing up in search or traces performed by other users and such other users can send requests for meetings. Preferably, users can chose to be "unavailable" yet still show up and searches so other users can select "watch" if interested in meeting and be notified when the user changes to "available". Preferably, the user can select "unavailable" yet show up for other user's meeting search criteria or background (e.g., having a verified email domain from a specified company or college). Preferably, a user can set preferences to only allow such specified users to send meeting requests or accept the user's invites for meetings.

According to another embodiment, a first user can set preferences indicating the type of people the user would like to network with. Preferably, notifications will be sent to the user based on the set preferences. Preferably, other users may be notified of the first user based on the set preferences. Preferably, set preferences include characteristics of individuals the first user would like to meet such as one or more of the following: (a) verified email domains, (b) industries, (c) job title or job function, (d) company or companies or industries worked, (e) schools attended; (f) majors; (g) meeting interests, etc.

Preferably, a user can select to only be notified of or be sent meeting requests from other users having certain specified characteristics. For example, a user may require other users have a verified email domain from a specific company before initiating a request to meet or before showing up in any searches or notifications.

Preferably, the user can select a trace radius (e.g., within 1 mile, within 5 miles, etc.) for searches or notifications based on the user's location determined by GPS or similar technology.

The methods of the invention can also be implemented as machine executable instructions executed by a programmable information processing system or as hard coded logic in a specialized computing apparatus such as an application-specific integrated circuit (ASIC). Suitable related systems suitable for implementing the methods and systems of the invention are described in U.S. Pat. No. 7,532,900 to Wilson et. al. (description of "Representative System" and "Representative Message Flows" including FIGS. 1 and 2 and the flow diagrams of FIGS. 3-12 and associated description). The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods of the invention may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. Suitable systems are described in U.S. Pat. No. 7,603,556 to Brown et al. (specifically, the descriptions of FIGS. 1, 2 and 5) and U.S. Pat. No. 7,673,327 to Polis et al (specifically the description of FIG. 1), each hereby incorporated by reference.

Figure 9:
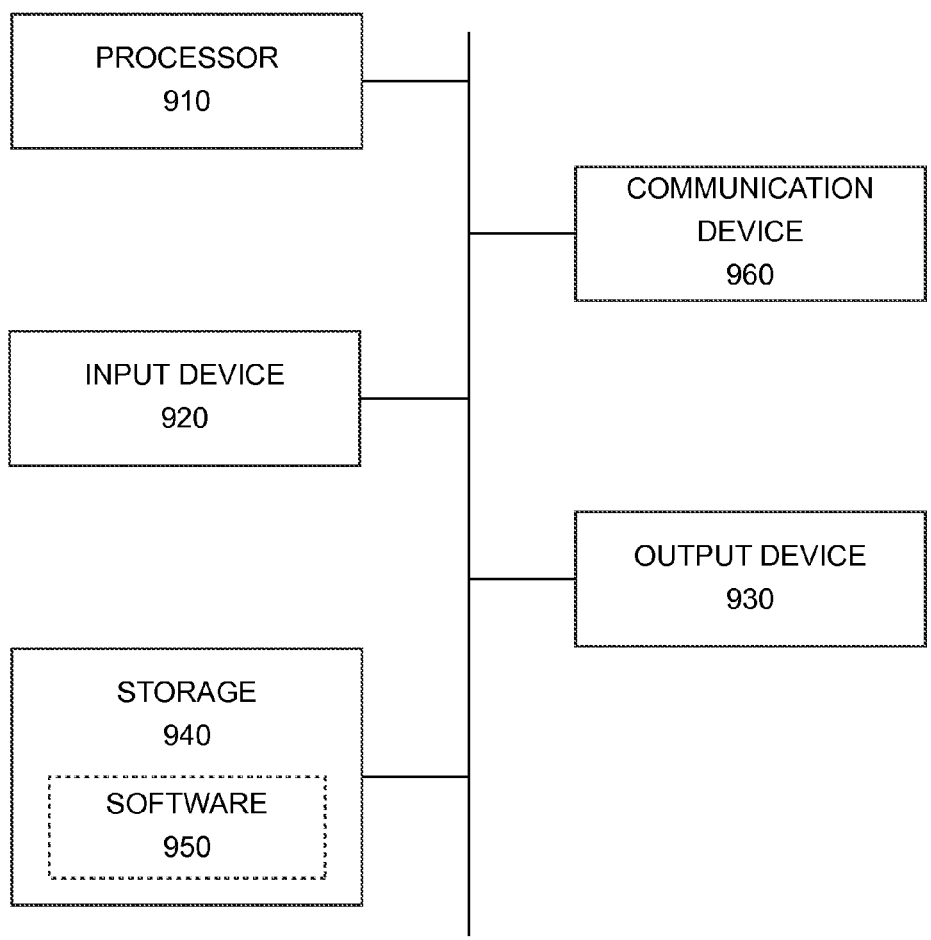
FIG. 9 is a block diagram that depicts a computing device in accordance with an embodiment of the present invention.

FIG. 9 illustrates the components of a basic computing device in accordance with an embodiment of the present invention; a computing device as depicted may constitute any one or more of the user/vendor terminals (100, 110, 120) and a server running the meeting engine (140), for example. The computing device may be a personal computer, workstation, server, or any other type of microprocessor-based device, including for example a mobile electronic device such as a PDA (personal digital assistant) or a mobile telephone. The computing device may include one or more of a processor (910), input device (920), output device (930), storage (940), and communication device (960).

The input device (920) may include a keyboard, mouse, pen-operated touch screen or monitor, voice-recognition device, or any other device that provides input. The output device (930) may include a monitor, printer, disk drive, speakers, or any other device that provides output.

The storage (940) may include volatile and nonvolatile data storage, including one or more electrical, magnetic or optical memories including such as a RAM, cache, hard drive, CD-ROM drive, tape drive or removable storage disk. The communication device (960) may include a modem, network interface card, or any other device capable of transmitting and receiving signals over a network. The components of the computing device may be connected in any manner, such as via electrical bus or wirelessly.

The software (950), which may be stored in the storage (940) and executed by the processor (910), may include, for example, the application programming that embodies the functionality of the present invention (e.g., as embodied in the meeting engine (140)). The software (950) may include a combination of client applications and enterprise servers such as an application server and a database server.

Communications may occur over any type of network (105), which may implement any communications protocol, which may be secured by any security protocol. Network links may include telephone lines, DSL, cable networks, T1 or T3 lines, wireless network connections, or any other arrangement that implements the transmission and reception of network signals.

The computing device may implement any operating system, such as Windows, Linux or UNIX. The software (950) may be written in any programming language, such as C, C++, Java, Ruby on Rails, Visual Basic and/or SQL. In various embodiments, application software embodying the functionality of the present invention may be deployed on a standalone machine, in a client/server arrangement or through a Web browser as a Web-based application or Web service, for example.

With respect to the appended claims, unless stated otherwise, the term "first" does not, by itself, require that there also be a "second".

While the particular methods, devices and systems described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

It will be appreciated that modifications and variations of the invention are covered by the above teachings and within the purview of the appended claims without departing from the spirit and intended scope of the invention. For example, software modules that implement the present invention such as the meeting engine (140) may comprise several discrete modules that together still provide the same functionality, data specified in the illustrated databases (150, 160, 170) may be spread over several databases and/or systems (e.g., a server may be two or more servers acting together) and the flow diagrams of FIGS. 2-8 may encompass combined steps or several intermediate steps that do not detract from the higher level functionality described therein. As used herein and in the appended claims, a "server" should be understood to refer to one server or more than one server.

The invention claimed is:

1. A computer-based method of verifying a user comprising:
   (a) verifying an email address provided by said user using one or more computer-based systems; and
   (a) displaying an indication that said user verified said email address to other users using software executed by a processor without displaying said email address,
   wherein said indication of said verification is displayed on an online profile of said user and includes a display of the email domain of said email address and wherein said email address includes an email domain for a company or a college or university and said indication verifies said user verified said email address having said email domain.

2. The method of claim 1, further comprising verifying a second email address provided by said user and displaying an indication that said user verified said second email address to other users without displaying said second email address.

3. The method of claim 1, wherein said verifying registers said user to use or access a website or application and said online profile of said user with said indication is used on said website or application.

4. A computer-based method of verifying a user for membership or access to a website or application comprising:
  (a) verifying an email address provided by said user; and
  (b) displaying an indication that said user verified said email address to other users of said website or application without displaying said email address,
  wherein said email address includes an email domain for a company or a college or university and said indication verifies the user verified said email address having said email domain and said indication includes a display of the email domain of said email address.

5. The method of claim 4, wherein said indication is displayed on an online profile of said user.

6. The method of claim 4, further comprising verifying a second email address provided by said user and displaying an indication that said user verified said second email address to other users without displaying said second email address.

7. The method of claim 4, wherein said indication further includes a characteristic or trait of the email domain of said email address without disclosing the email address.

8. A method for registering a user for a computer-based website or application, comprising:
  receiving by a server a request from a first user over a network to register;
  determining whether one or more rules associated with registration apply to the request from the first user to register;
  processing the request if all rules determined to be applicable are satisfied; and
  denying the request if one or more rules determined to be applicable are not satisfied;
  wherein said method further comprises:
  (a) verifying an email address provided by said first user; and
  (b) displaying an indication that said first user verified said email address to other users without displaying said email address,
  wherein said email address includes an email domain for a company or a college or university and said indication verifies the user verified said email address having said email domain and said indication includes a display of the email domain of said email address.

9. A computer-based method comprising:
  (a) receiving by a server a request from a first user over a network to verify an email address of said first user;
  (b) determining whether one or more rules associated with verification apply to the request from the first user;
  (c) processing the request if all rules determined to be applicable are satisfied;
  and denying the request if one or more rules determined to be applicable are not satisfied; and
  (d) transmitting a verification email to said email address of said first user;
  wherein said method further comprises verification of said email address and displaying an indication of said verification on an online or computed-based profile of said first user without displaying the email address of said first user and wherein said email address has an email domain and said indication includes a display of said email domain without displaying the entire email address and wherein said email address includes an email domain for a company or a college or university and said indication verifies said user verified said email address having said email domain.

10. The method of claim 9, further comprising verifying a second email address provided by said first user and displaying an indication that said first user verified said second email address to other users without displaying said second email address.

11. A computer-based method of verifying a user comprising:
  (a) verifying specific information including a valid email address provided by said user using one or more computer-based systems, wherein said specific information includes identity or background information; and
  (b) displaying an indication that said user verified said specific information to other users using software executed by a processor without displaying said specific information and without revealing the identity of said user,
  wherein said user is requested to provide said valid email address to register to a website and said indication includes a display of a portion of said specific information without displaying all of said specific information and without displaying the entire valid email address and said indication is displayed on an online profile of said user on said website and said verifying comprises said user receiving a code and inputting said code on said website and wherein said valid email address includes an email domain for a company or a college or university.

* * * * *